(12) United States Patent
Lu et al.

(10) Patent No.: US 7,859,763 B2
(45) Date of Patent: Dec. 28, 2010

(54) FIXED-FOCUS LENS

(75) Inventors: Yi-Tien Lu, Hsinchu (TW);
Chien-Hsiung Tseng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/705,288

(22) Filed: Feb. 12, 2010

(65) Prior Publication Data

US 2010/0259839 A1 Oct. 14, 2010

(30) Foreign Application Priority Data

Apr. 10, 2009 (TW) ............... 98112015 A

(51) Int. Cl.
*G02B 9/00* (2006.01)
*G02B 9/12* (2006.01)
(52) U.S. Cl. ...................... 359/649; 359/792
(58) Field of Classification Search ......... 359/649–651, 359/792
See application file for complete search history.

(56) References Cited

U.S. PATENT DOCUMENTS

| | | | |
|---|---|---|---|
| 5,805,350 A | 9/1998 | Yamamoto | |
| 5,835,286 A * | 11/1998 | Yamanashi | ................. 359/755 |
| 5,914,818 A | 6/1999 | Tejada et al. | |
| 6,011,656 A | 1/2000 | Chuang | |
| 6,084,719 A | 7/2000 | Sugawara et al. | ........... 359/651 |
| 6,185,041 B1 | 2/2001 | Tadic-Galeb et al. | ........ 359/618 |
| 6,285,509 B1 | 9/2001 | Nakayama et al. | |
| 6,542,316 B2 | 4/2003 | Yoneyama | ................... 359/749 |
| 6,577,455 B2 | 6/2003 | Shikama | ..................... 359/753 |
| 6,590,716 B2 | 7/2003 | Narimatsu | |
| 6,687,059 B2 | 2/2004 | Mihara | |
| 6,741,398 B2 | 5/2004 | Yasui | |
| 6,912,095 B2 | 6/2005 | Yamada | |
| 6,935,751 B2 | 8/2005 | Rieche et al. | ................. 353/69 |
| 6,937,401 B2 | 8/2005 | Sugano | ....................... 359/649 |
| 7,075,622 B2 | 7/2006 | Narimatsu | |
| 7,075,733 B2 | 7/2006 | Itoh | ........................... 359/689 |
| 7,119,966 B2 | 10/2006 | Yamagishi | .................. 359/649 |

FOREIGN PATENT DOCUMENTS

TW I257009 6/2006

* cited by examiner

*Primary Examiner*—William C Choi
(74) *Attorney, Agent, or Firm*—J.C. Patents

(57) ABSTRACT

A fixed-focus lens includes a first, a second, and a third lens groups arranged in sequence from the enlarged side to the reduced side and having positive refractive powers. The first lens group includes a first, a second, and a third lenses from the enlarged side to the reduced side. The second lens group includes a fourth, a fifth, and a sixth lenses from the enlarged side to the reduced side. The third lens group includes a seventh lens. The lens of the first lens group closest to the enlarged side in the fixed-focus lens has a concave surface. The distance between the lens surface of the second lens group closest to the reduced side and the lens surface of the third lens group closest to the enlarged side is $L_1$. The overall length of the fixed-focus lens is L. The fixed-focus lens satisfies $0.1 < L_1/L < 0.5$.

18 Claims, 4 Drawing Sheets

FIXED-FOCUS LENS

CROSS-REFERENCE TO RELATED APPLICATION

This application claims the priority benefit of Taiwan application serial no. 98112015, filed Apr. 10, 2009. The entirety of the above-mentioned patent application is hereby incorporated by reference herein and made a part of specification.

BACKGROUND OF THE INVENTION

1. Field of the Invention

The invention generally relates to a lens, and more particularly, to a fixed-focus lens.

2. Description of Related Art

In recent years, conventional cathode ray tubes (CRTs) are gradually replaced by digital display apparatuses, such as liquid crystal displays (LCDs), digital light processors (DLPs), and plasma display panels (PDPs), and these digital display apparatuses are widely used in the new generation of display apparatuses. Since digital video signals have advantages of being transmitted and processed without distortion, it is the trend to apply the digital display apparatuses to projection display apparatuses, such as rear projection digital display apparatuses. However, for designers of optical apparatuses, there are a lot of challenges related to fixed-focus lenses used in the projection display apparatus.

For example, in order to achieve good imaging quality, the fixed-focus lens used in the normal projection display apparatus usually has characteristics of little distortion and image aberration, high definition, high contrast ratio, and uniform luminance. Moreover, in addition to good imaging quality, the fixed-focus lens used in the projection display apparatus preferably has a large field of view (FOV), so that the projection display apparatus satisfies the requirement for projecting large frames in small space. Furthermore, in order to enhance light source utilization and luminance uniformity of projected frames, it is preferable for the main light ray near the reduced side in the fixed-focus lens to be substantially parallel to the optical axis. That is, it is preferable for a telecentric angle of the main light ray near the reduced side relative to the optical axis to be as small as possible.

However, for the conventional fixed-focus lens, in order to satisfy the condition, i.e. the main light ray near the reduced side of the conventional fixed-focus lens is substantially parallel to the optical axis, a length of the conventional fixed-focus lens and sizes of lenses used therein are increased. Accordingly, a shorter length of the fixed-focus lens is not provided. Moreover, in order to reduce distortion and image aberration, the number of lenses used therein and the field of view (FOV) thereof are limited, so that the requirement for projecting large frames in small space may not be met. Furthermore, aspheric lenses are generally used in the conventional fixed-focus lens to modify image aberration, so that the characteristics of little distortion and image aberration, high definition, high contrast ratio, and uniform luminance of the frames are provided. However, the aspheric lenses are hard to be manufactured and have high cost, so that the cost of the conventional fixed-focus lens is hard to be reduced.

SUMMARY OF THE INVENTION

One embodiment of the present invention provides a fixed-focus lens having low cost and good optical characteristics.

Some advantages of the invention may be further understood by referring to the technical features broadly embodied and described as follows.

In order to achieve one or a part of or all of the above advantages or other advantages, an embodiment of the invention provides a fixed-focus lens. The fixed-focus lens includes a first lens group, a second lens group, and a third lens group. The first lens group is disposed between an enlarged side and a reduced side and has a positive refractive power. The first lens group includes a first lens, a second lens, and a third lens arranged in sequence from the enlarged side to the reduced side. In the fixed-focus lens, the first lens is closest to the enlarged side, and the first surface of the first lens facing the enlarged side is a convex surface. The second lens group is disposed between the first lens group and the reduced side and has a positive refractive power. The second lens group includes a fourth lens, a fifth lens, and a sixth lens arranged in sequence from the enlarged side to the reduced side. The third lens group is disposed between the second lens group and the reduced side and has a positive refractive power. The third lens group includes a seventh lens. In the second lens group, a lens surface closest to the reduced side is a second surface. In the third lens group, a lens surface closest to the enlarged side is a third surface. The overall length of the fixed-focus lens is L, the distance between the second surface and the third surface is $L_1$, and the fixed-focus lens satisfies $0.1 < L_1/L < 0.5$.

In an embodiment of the invention, the effective focal length of the fixed-focus lens is f, the effective focal length of the first lens group is $f_1$, and the fixed-focus lens satisfies $0.3 < \mu1 f < 0.9$. The effective focal length of the fixed-focus lens is f, the effective focal length of the third lens group is $f_3$, and the fixed-focus lens satisfies $0.8 < f_3/f < 2$. The surface of the fourth lens facing the reduced side has a curvature radius R, the effective focal length of the fixed-focus lens is f, and the fixed-focus lens satisfies $0.2 < R/f < 1$. The surfaces of the third lens facing the enlarged side and the reduced side are a fourth surface and a fifth surface, respectively.

The surface of the fourth lens facing the enlarged side is a sixth surface. The surface of the fifth lens facing the reduced side is a seventh surface. The distance between the fifth surface and the sixth surface is $L_2$, the distance between the fourth surface and the seventh surface is $L_3$, and the fixed-focus lens satisfies $0.2 < L_2/L_3 < 0.5$.

In an embodiment of the invention, the first lens group is a negative distortion lens group, and the second lens group is a positive distortion lens group. The position of the third lens group is fixed relative to the fixed-focus lens. The positions of the first lens group and the second lens group relative to each other remain unchanged, and the first lens group and the second lens group are capable of focusing by moving the third lens group relative thereto.

In an embodiment of the invention, each of the first lens, the second lens, the third lens, the fourth lens, the fifth lens, the sixth lens, and the seventh lens is a spherical lens. Refractive powers of the first lens, the second lens, and the third lens, for example, are negative, positive, and positive in sequence. Refractive powers of the fourth lens, the fifth lens, and the sixth lens, for example, are negative, positive, and positive in sequence. The refractive power of the seventh lens, for example, is positive.

In an embodiment of the invention, the first lens is a biconcave lens, and each of the second lens and the third lens is a biconvex lens. The fourth lens, for example, is a biconcave lens, the fifth lens, for example, is a concave-convex lens with a convex surface facing the reduced side, and the sixth lens, for example, is a concave-convex lens with a convex surface facing the enlarged side. In an embodiment of the invention, the fourth lens is a biconcave lens, the fifth lens is a concave-convex lens with a convex surface facing the reduced side, and the sixth lens is a biconvex lens. The seventh lens, for example, is a plane-convex lens with a convex surface facing the reduced side.

In an embodiment of the invention, the fixed-focus lens further includes a total internal reflection prism, wherein the total internal reflection prism leans against the seventh lens and is disposed between the second lens group and the third lens group. The fixed-focus lens further includes an aperture stop. The aperture stop is disposed between the first lens group and the second lens group.

In view of the above, the embodiment or the embodiments of the invention may have at least one of the following advantages, there are seven spherical lenses used in the fixed-focus lens of the embodiment of the invention to reduce image aberration. Accordingly, the fixed-focus lens has good image quality, so as to have low cost and good optical characteristics. Besides, in the fixed-focus lens, the surface of the lens closest to the enlarged side facing the enlarged side is a convex surface, so that a field of view (FOV) of the fixed-focus lens is increased.

In order to make the aforementioned and other features and advantages of the present invention more comprehensible, several embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
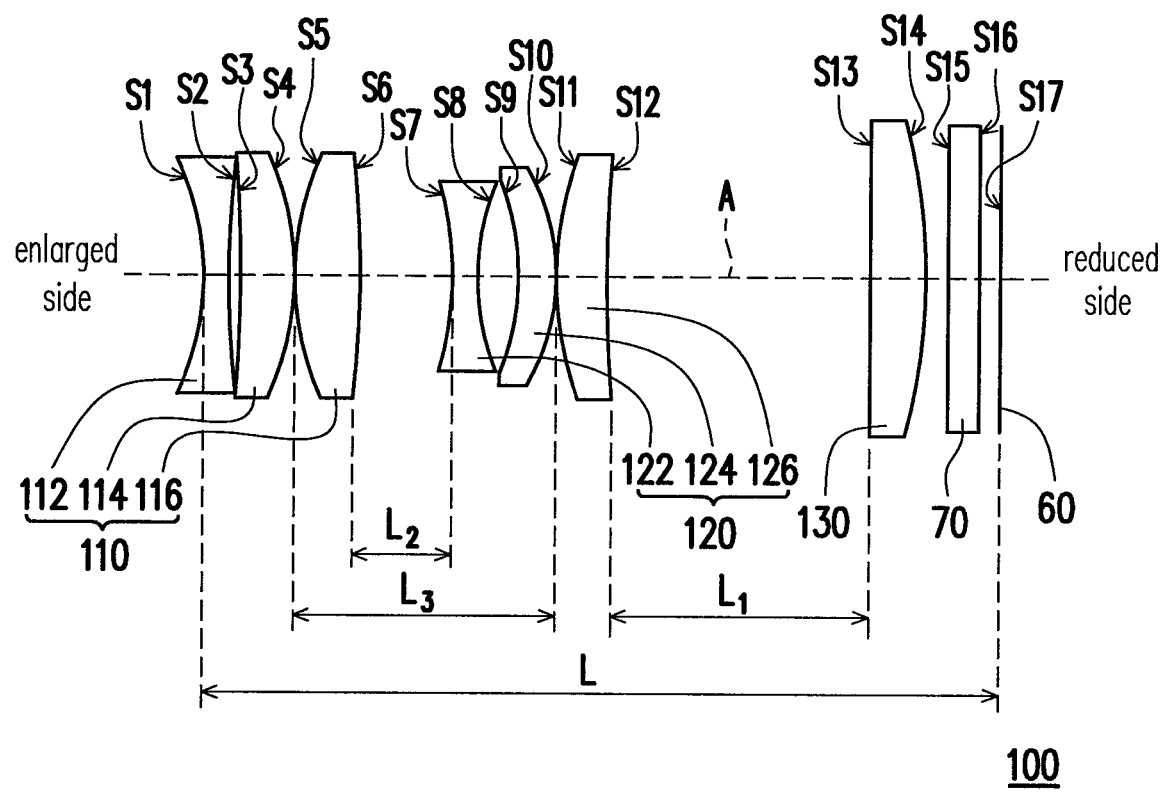
FIG. 1 is a schematic view of a fixed-focus lens according to an embodiment of the invention.

Referring to FIG. 1, the fixed-focus lens 100 of the present embodiment is disposed between an enlarged side and a reduced side and includes a first lens group 110, a second lens group 120, and a third lens group 130 arranged in sequence from the enlarged side to the reduced side. In the present embodiment, refractive powers of the first lens group 110, the second lens group 120, and the third lens group 130 are all positive.

Specifically, the first lens group 110 includes a first lens 112, a second lens 114, and a third lens 116 arranged in sequence from the enlarged side to the reduced side, and refractive powers of the first lens 112, the second lens 114, and the third lens 116, for example, are negative, positive, and positive. The second lens group 120 includes a fourth lens 122, a fifth lens 124, and a sixth lens 126 arranged in sequence from the enlarged side to the reduced side, and refractive powers of the fourth lens 122, the fifth lens 124, and the sixth lens 126, for example, are negative, positive, and positive. Herein, the third lens group 130 is composed of a seventh lens 130, and the refractive power of the third lens group 130, for example, is positive. Specifically, in the present embodiment, the first lens 112 is a biconcave lens, each of the second lens 114 and the third lens 116 is a biconvex lens, the fourth lens 122 is a biconcave lens, the fifth lens 124 is a concave-convex lens with a convex surface facing the reduced side, the sixth lens 126 is a concave-convex lens with a convex surface facing the enlarged side, and the seventh lens 130 is a plane-convex lens with a convex surface facing the reduced side. Furthermore, in the present embodiment, the seven lenses constituting the fixed-focus lens 100 are all spherical lenses.

Generally, an image processing device 60 may be disposed at the reduced side. In the present embodiment, the image processing device 60, for example, is a light valve. The light valve, for example, is a digital micro-mirror device (DMD), a liquid-crystal-on-silicon panel (LCOS panel), or a transmissive liquid crystal display panel (transmissive LCD panel). Besides, in the present embodiment, the fixed-focus lens 100 is capable of imaging an image provided by the image processing device 60 at the enlarged side.

In the present embodiment, the first lens 112 is closest to the enlarged side in the fixed-focus lens 100, and a surface S1 of the first lens 112 facing the enlarged side is a convex surface, so that the field of view (FOV) is increased. As a result, the problem of excessively small curvature radii of a surface S4 of the second lens 114 and a surface S5 of the third lens 116 because of an attempt to maintain a wide field of view (FOV) and reduce the image aberration may be resolved, and complexity of fabricating the second lens 114 and the third lens 116 can be reduced. Furthermore, in order to ensure the optical image quality, the fixed-focus lens 100 in the present embodiment satisfies the following condition I, $$0.3<f_1/f<0.9 \qquad \text{(condition I)}$$

wherein the effective focal length of the fixed-focus lens 100 is f, and the effective focal length of the first lens group 110 is $f_1$. Furthermore, the surface S1 is a concave surface, so that the image is a negatively distorted image. The smaller the curvature radius of the surface S1 is, the greater the negative distortion is. Accordingly, in order to reduce the degree of negative distortion, the second lens group 120 is designed to be a positive distortion lens group to compensate the negatively distorted image caused by the first lens group 110 in the present embodiment. Based on the above, in the present embodiment, the fixed-focus lens 100 in the present embodiment satisfies the following condition II, $$0.2<R/f<1 \qquad \text{(condition II)}$$

wherein the curvature radius of the surface S8 of the fourth lens 122 is R. As known from the condition II, if R/f>1, the positive distortion of the image by the fourth lens 122 is not enough to compensate the negative distortion of the image by the first lens group 110. On the contrary, if R/f<0.2, the positive distortion of the image by the fourth lens 122 overly compensates the negative distortion of the image by the first lens group 110. Thereby, the surface S7 of the fourth lens 122 has to distort the image more negatively to make up for the above over-compensation, thus resulting in complex "off-axis aberration". In order to maintain a good imaging quality, the fixed-focus lens 100 satisfies the condition II. Besides, in the present embodiment, the fixed-focus lens 100 also satisfies the following condition III, $$0.2<L_2/L_3<0.5 \qquad \text{(condition III)}$$

wherein $L_2$ is an axis distance (i.e. a distance on an optical axis A of the fixed-focus lens 100) between the surface S6 of the third lens 116 and the surface S7 of the fourth lens 122, and $L_3$ is an axis distance between the surface S5 of the third lens 116 and the surface S10 of the fifth lens 124. As known from the condition III, if $L_2/L_3$<0.2, the fourth lens 122 is close to the third lens 116 and is farther from the fifth lens 124. Since the fourth lens 122 is close to the third lens 116, after a light beam passes through the surface S6 having a larger curvature radius, the light beam soon enters the fourth lens 122. After passing through the fourth lens 122, the light beam is less refracted, so that the fifth lens 124 is required to have a larger size for receiving the light beam from the fourth lens 122. As such, the size of the sixth lens 126 has to be increased. Accordingly, the cost of manufacturing the lens is increased due to the lens with larger size, and the design principle of miniaturization is violated. Furthermore, after passing through the fourth lens 122, the light beam is not greatly refracted, so that the distance between the second lens group 120 and the third lens group 130 may not meet the distance required by the fixed-focus lens 100 for focusing. On the contrary, if $L_2/L_3$>0.5, the fourth lens 122 is closer to the fifth lens 124 and is farther from the third lens 116. Therefore, the fourth lens 122 needs to have a larger refractive power to refract the light beam passing therethrough, while the fourth lens 122 having the larger refractive power may cause a serious image aberration. Based on the above, in order to maintain good imaging quality, the fixed-focus lens 100 satisfies the condition III.

In the present embodiment, positions of the first lens group 110 and the second lens group 120 relative to each other remain unchanged, and the position of the third lens group 130 is fixed relative to the fixed-focus lens 100. The first lens group 110 and the second lens group 120 may move relative to the third lens group 130 to focus. Accordingly, it is preferable that the distance between the second lens group 120 and the third lens group 130 is not too short, and therefore the fixed-focus lens 100 also satisfies the following condition IV, $$0.1<L_1/L<0.5 \qquad \text{(condition IV)}$$

wherein $L_1$ is an axis distance between the surface S12 of the sixth lens 126 and a surface S13 of the seventh lens 130, and the overall length of the fixed-focus lens 100 is L. That is, the overall length L is the axis distance between the surface S1 of the first lens 112 and the surface S17 of the light valve 60. As known from the condition IV, if $L_1/L$>0.5, the overall length L of the fixed-focus lens 100 is too long to achieve the purpose of miniaturization. On the contrary, if $L_1/L$<0.1, the distance between the second lens group 120 and the third lens group 130 is too short to meet the distance required by the fixed-focus lens 100 for focusing. Therefore, in order to be miniaturized, the fixed-focus lens 100 satisfies the condition IV. Besides, in the present embodiment, in order to make a main light ray near the reduced side in the fixed-focus lens 100 substantially parallel to the optical axis A, i.e. the fixed-focus lens 100 is similar to a telecentric lens, the third lens group 130 of the fixed-focus lens 100 may be designed to have a positive refractive power, and the fixed-focus lens 100 satisfies the following condition V, $$0.8<f_3/f<2 \qquad \text{(condition V)}$$

wherein $f_3$ is the effective focal length of the third lens group 130. If $f_3/f$<0.8, the third lens group 130 does not have enough refractive power, so that the main light ray near the reduced side in the fixed-focus lens 100 is not substantially parallel to the optical axis A. However, to achieve the above purpose, the size of the sixth lens 126 has to be increased, so that the cost of fabricating the fixed-focus lens 100 is also increased. If $f_3/f$>2, the curvature radius of the surface S14 is too small, so that the lens is hard to be manufactured. Accordingly, in order to reduce the cost and the difficulty of fabricating the lens, the fixed-focus lens 100 satisfies the condition V. In the present embodiment, there is an aperture stop (not shown) disposed between the first lens group 110 and the second lens group 120 and located on the surface S6 of the third lens 116.

An embodiment of the fixed-focus lens 100 is given hereinafter. However, the invention is not limited to the data listed in the following Table 1. Those having ordinary skill in the art that various modifications and variations may be made to the structure of the invention without departing from the scope or spirit of the invention.

TABLE 1

| Surface | Curvature Radius (mm) | Distance (mm) | Index of Refraction | Abbe Number | Notes |
|---|---|---|---|---|---|
| S1 | −11.23 | 0.8 | 1.72 | 28.46 | First lens |
| S2 | 16.69 | 0.26 | | | |
| S3 | 25.07 | 1.86 | 1.83 | 37.16 | Second lens |
| S4 | −14.67 | 0.1 | | | |
| S5 | 8.64 | 1.89 | 1.83 | 37.16 | Third lens |
| S6 | −135.56 | 3.47 | | | |
| S7 | −13.44 | 0.8 | 1.84 | 23.77 | Fourth lens |
| S8 | 7.67 | 1.27 | | | |
| S9 | −12.47 | 1.45 | 1.83 | 37.16 | Fifth lens |
| S10 | −8.06 | 0.1 | | | |

TABLE 1-continued

| Surface | Curvature Radius (mm) | Distance (mm) | Index of Refraction | Abbe Number | Notes |
|---|---|---|---|---|---|
| S11 | 11.21 | 1.57 | 1.63 | 55.38 | Sixth lens |
| S12 | 57.19 | 8.66 | | | |
| S13 | infinity | 1.81 | 1.83 | 37.16 | Seventh lens |
| S14 | −20 | 0.7 | | | |
| S15 | infinity | 1.05 | 1.5 | 61.18 | Cover Glass |
| S16 | infinity | | | | |

In Table 1, the distance refers to a linear distance along the optical axis A between two neighboring surfaces. For example, the distance of the surface S3 is the linear distance along the optical axis A between the surface S3 and the surface S4. The corresponding thickness, refractive index, and Abbe number of each lens in the Notes column respectively refer to the numeral value of each distance, refractive index, and Abbe number in the same row. Moreover, in Table 1, the surfaces S1 and S2 are two surfaces of the first lens 112, the surfaces S3 and S4 are two surfaces of the second lens 114, the surfaces S5 and S6 are two surfaces of the third lens 116, the surfaces S7 and S8 are two surfaces of the fourth lens 122, the surfaces S9 and S10 are two surfaces of the fifth lens 124, the surfaces S11 and S12 are two surfaces of the sixth lens 126, and the surfaces S13 and S14 are two surfaces of the seventh lens 130. Surfaces S15 and S16 are two surfaces of the cover glass 70 used in the light valve 60.

The numeral values of the parameters, such as the curvature radius and the distance of each surface, are given in Table 1 and are not be repeated herein again.

Figure 2A:
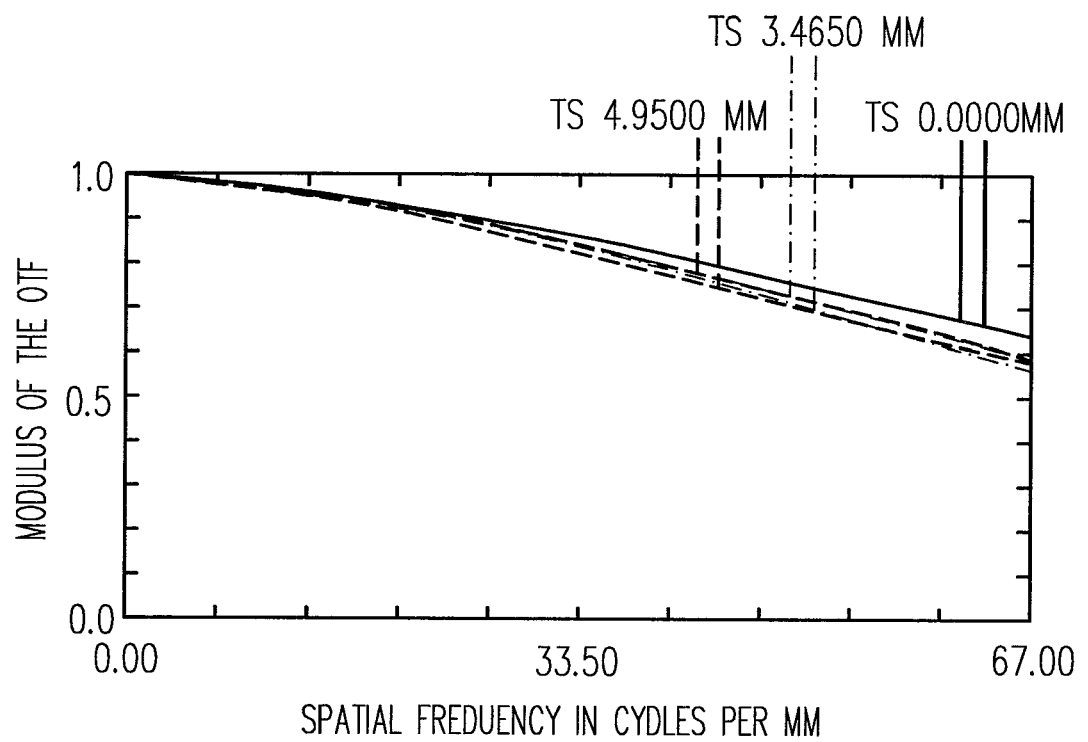
FIGS. 2A through 2C are diagrams showing the optical simulation data of imaging of the fixed-focus lens 100 in FIG. 1.
Figure 2B:
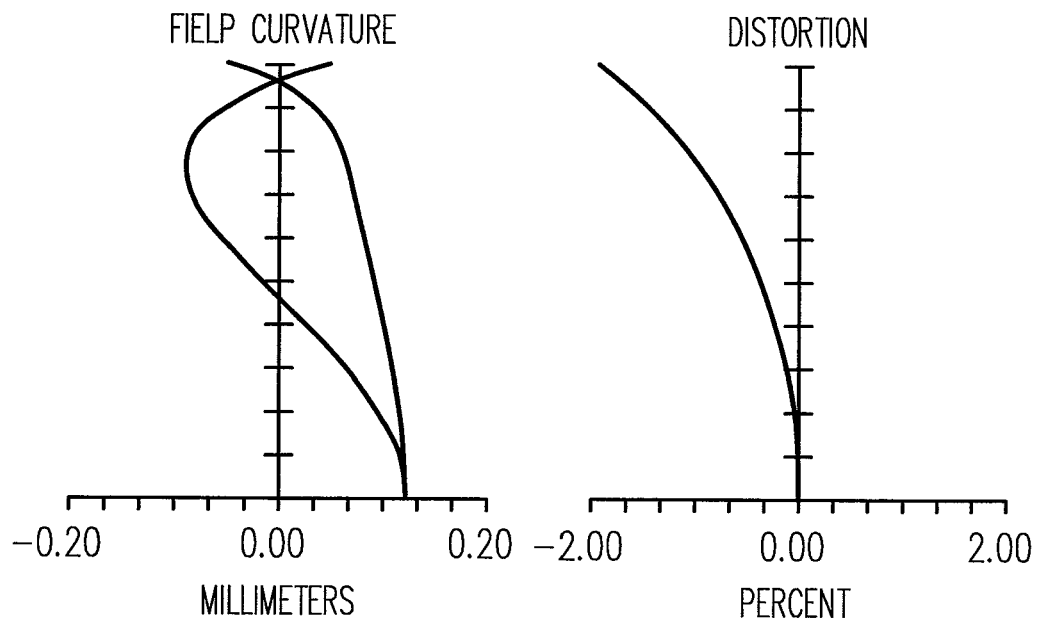
Figure 2C:
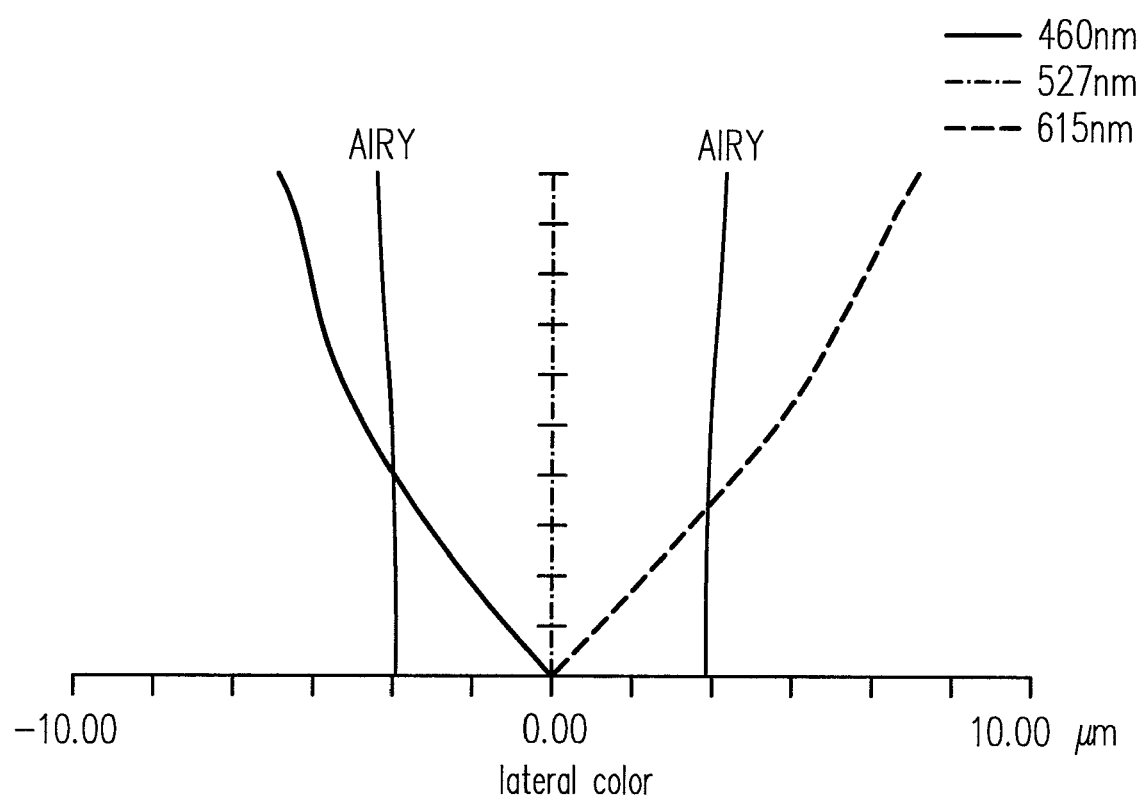

Referring to FIGS. 2A through 2C, FIG. 2A is a modulation transfer function (MTF) graph. In FIG. 2A, the transverse axis denotes a spatial frequency in cycles per millimeter, and the longitudinal axis denotes a modulus of the optical transfer function (OTF). FIG. 2A is a simulation data diagram obtained with light having wavelengths of 460 nm, 527 nm, and 615 nm. Moreover, FIG. 2B shows graphics of field curvature and distortion respectively from left to right and is simulated with a light having wavelength of 527 nm. FIG. 2C is a lateral color diagram obtained with light having wavelengths of 460 nm, 527 nm, and 615 nm. Since all the graphics shown in FIGS. 2A through 2C fall within a standard range, the fixed-focus lens 100 of this embodiment has good imaging quality.

Some simulation parameters, such as the effective focal length, the field of view (FOV), the telecentric angle, and the simulation parameters of the fixed-focus lens 100 satisfying the conditions I through V, are listed in Table 2.

TABLE 2

| Items | Values |
|---|---|
| EFL | 17.2722 |
| field of view (FOV) | 34.78° |
| Telecentric angle | 2° |
| $f_1/f$ | 0.543 |
| R/f | 0.444 |
| $L_2/L_3$ | 0.39 |
| $L_1/L$ | 0.326 |
| $f_3/f$ | 1.375 |

In the present embodiment, the first lens group 110 is a negative distortion lens group, while the second lens group 120 is a positive distortion lens group. After a light beam passes through the first lens group 110, a negatively distorted image is generated, but after the negatively distorted image is compensated through the second lens group 120, the negatively distorted image is modified and becomes an image with less distortion or without distortion. As a result, in the fixed-focus lens 100, the first lens group 110 and the second lens group 120 are configured to eliminate image aberration of optical imaging. Besides, the third lens group 130 has the positive refractive power, so that the main light ray near the reduced side in the fixed-focus lens 100 is substantially parallel to the optical axis A. Therefore, the fixed-focus lens 100 has the advantages of small image aberration of imaging, a low distortion degree, and so on. Moreover, all of the lenses used in the fixed-focus lens 100 are spherical lenses, so that the fixed-focus lens 100 has low cost and good optical quality. Besides, the position of the third lens group 130 is fixed relative to the fixed-focus lens 100, and thus the fixed-focus lens 100 may focus by moving the first lens group 110 and the second lens group 120 relative to the third lens group 130.

Figure 3:
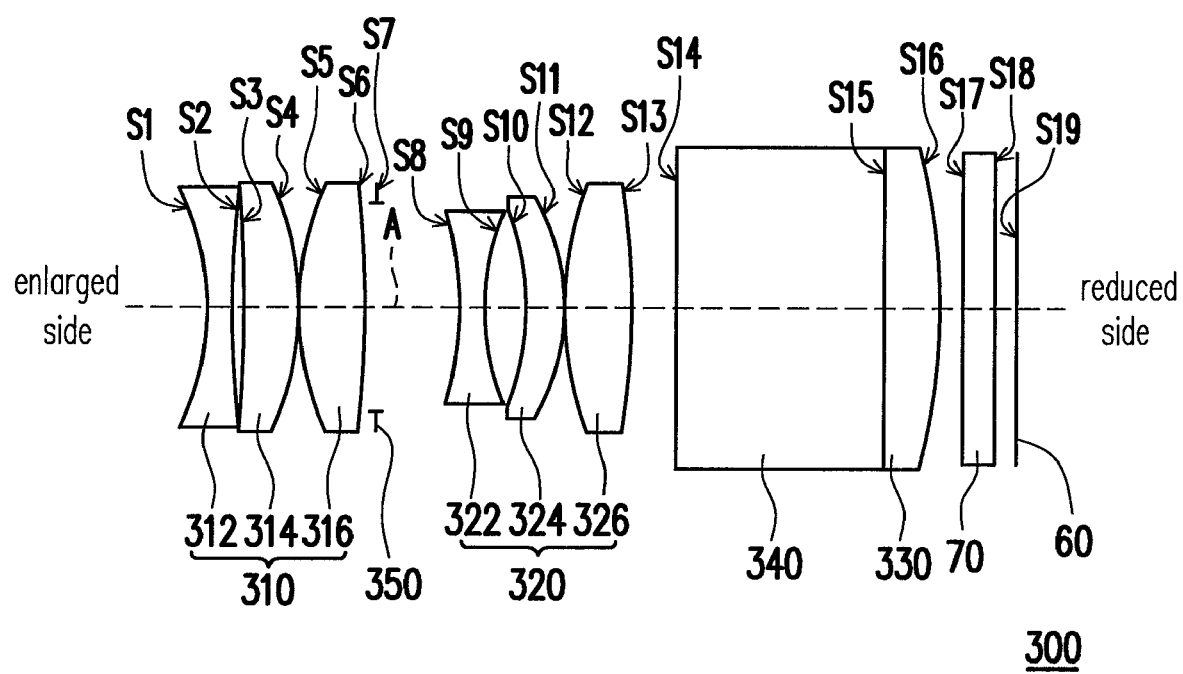
FIG. 3 is a schematic view of a fixed-focus lens according to another embodiment of the invention.

Referring to FIG. 3, the fixed-focus lens 300 of the present embodiment is similar to the fixed-focus lens 100, while the main difference therebetween lies in that the fixed-focus lens 300 further includes a total internal reflection prism 340 leaning against the seventh lens 330. In the present embodiment, the internal reflection prism 340 adheres to the surface S15 of the seventh lens 330 by glue bonding. In the present embodiment, the fixed-focus lens 300 is adapted to be applied to a projection apparatus. The seventh lens 330 is considered as a part of a lighting system and a part of an imaging system, so that the size of the projection apparatus is reduced. In the present embodiment, the sixth lens 326 is a biconvex lens, and the fixed-focus lens 300 includes an aperture stop 350 between the first lens group 310 and the second lens group 320.

An embodiment of the fixed-focus lens 300 is given hereinafter. However, the invention is not limited to the data listed in Table 3. Those ordinary skilled in the art that various modifications and variations may be made to the structure of the invention without departing from the scope or spirit of the invention.

TABLE 3

| Surface | Curvature Radius (mm) | Distance (mm) | Index of Refraction | Abbe Number | Notes |
|---|---|---|---|---|---|
| S1 | −8.49 | 0.8 | 1.78 | 25.68 | First lens |
| S2 | 28.2 | 0.36 | | | |
| S3 | 139.82 | 1.95 | 1.83 | 37.16 | Second lens |
| S4 | −9.97 | 0.1 | | | |
| S5 | 8.45 | 2.3 | 1.83 | 37.16 | Third lens |
| S6 | −83.3 | 0.28 | | | |
| S7 | infinity | 3.37 | | | Aperture Stop |
| S8 | −9.19 | 0.8 | 1.84 | 23.77 | Fourth lens |
| S9 | 8.83 | 1.02 | | | |
| S10 | −2.12 | 1.62 | 1.83 | 37.16 | Fifth lens |
| S11 | −7.38 | 0.1 | | | |
| S12 | 11.08 | 1.94 | 1.48 | 70.23 | Sixth lens |
| S13 | −73.69 | 1.81 | | | |
| S14 | infinity | 7.11 | 1.51 | 64.16 | TIR |
| S15 | infinity | 1.81 | 1.83 | 37.16 | Seventh lens |
| S16 | −20 | 0.7 | | | |
| S17 | infinity | 1.05 | 1.5 | 61.18 | Cover Glass |
| S18 | infinity | | | | |

In Table 3, the surfaces S1 and S2 are two surfaces of the first lens 312, the surfaces S3 and S4 are two surfaces of the second lens 314, the surfaces S5 and S6 are two surfaces of the third lens 316, the surface S7 is the aperture stop 350, the surfaces S8 and S9 are two surfaces of the fourth lens 322, the surfaces S10 and S11 are two surfaces of the fifth lens 324, the surfaces S12 and S13 are two surfaces of the sixth lens 326, the surfaces S14 and S15 are two surfaces of the total internal reflection 340, and the surface S15 is the surface the total internal reflection prism 340 and the seventh lens 330 connected to. The surfaces S17 and S18 are two surfaces of the cover glass 70 used in the light valve 60.

The numeral values of the parameters, such as the curvature radius and the distance of each surface, are given in Table 3 and are not be repeated herein again. Some simulation parameters, such as the EFL, the field of view (FOV), the telecentric angle, and the simulation parameters of the fixed-focus lens 300 satisfying the conditions I through V, are listed in Table 4.

TABLE 4

| Items | Value |
|---|---|
| EFL | 14.7934 |
| field of view (FOV) | 37.78° |
| Telecentric angle | 3° |
| $f_1/f$ | 0.576 |
| R/f | 0.5969 |
| $L_2/L_3$ | 0.3889 |
| $L_1/L$ | 0.3201 |
| $f_3/f$ | 1.6052 |

To sum up, the embodiment or the embodiments of the invention may have at least one of the following advantages, all the lenses used in the fixed-focus lens of the present embodiment consistent with the invention are spherical lenses instead of aspheric lenses, so that the fixed-focus lens has low cost. Next, the configuration of the fixed-focus lens is conducive to effective elimination of the image aberration, the dichromatic aberration, and the distortion, so that the fixed-focus lens has good imaging quality. Moreover, in the fixed-focus lens, the lens closest to the enlarged side has a convex surface facing the enlarged side, so that the field of view (FOV) of the fixed-focus lens is increased. Furthermore, the fixed-focus lens performs the function of focus by moving the first lens group and the second lens group relative to the third lens group and, with the disposition of the third lens group, the main light ray near the reduced side in the fixed-focus lens is substantially parallel to the optical axis A. Finally, when the fixed-focus lens is applied to the projection apparatus, the fixed-focus lens may include the total internal reflection prism. Accordingly, the seventh lens may be regarded as a part of the lighting system and a part of the imaging system, and the size of the projection apparatus is reduced. As a result, the above-described embodiments of the invention provide the fixed-focus lenses having low cost and good optical characteristics.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, comprising:
   a first lens group disposed between an enlarged side and a reduced side, having a positive refractive power, and comprising a first lens, a second lens, and a third lens arranged in sequence from the enlarged side to the reduced side, wherein the first lens is closest to the enlarged side in the fixed-focus lens, and a first surface of the first lens facing the enlarged side is a concave surface;
   a second lens group disposed between the first lens group and the reduced side, having a positive refractive power, and comprising a fourth lens, a fifth lens, and a sixth lens arranged in sequence from the enlarged side to the reduced side, wherein a lens surface closest to the reduced side in the second lens group is defined as a second surface; and
   a third lens group disposed between the second lens group and the reduced side, having a positive refractive power, and comprising a seventh lens, wherein a lens surface closest to the enlarged side in the third lens group is defined as a third surface,
   wherein an overall length of the fixed-focus lens is L, a distance between the second surface and the third surface is $L_1$, and the fixed-focus lens satisfies $0.1<L_1/L<0.5$.

2. The fixed-focus lens as claimed in claim 1, wherein each of the first lens, the second lens, the third lens, the fourth lens, the fifth lens, the sixth lens, and the seventh lens is a spherical lens.

3. The fixed-focus lens as claimed in claim 1, wherein an effective focal length of the fixed-focus lens is f, an effective focal length of the first lens group is $f_1$, and the fixed-focus lens satisfies $0.3<f_1/f<0.9$.

4. The fixed-focus lens as claimed in claim 1, wherein an effective focal length of the fixed-focus lens is f, an effective focal length of the third lens group is $f_3$, and the fixed-focus lens satisfies $0.8<f_3/f<2$.

5. The fixed-focus lens as claimed in claim 1, wherein a position of the third lens group is fixed relative to the fixed-focus lens.

6. The fixed-focus lens as claimed in claim 5, wherein positions of the first lens group and the second lens group relative to each other are fixed, and the first lens group and the second lens group are capable of moving relative to the third lens group for focusing.

7. The fixed-focus lens as claimed in claim 1, wherein the first lens group is a negative distortion lens group, and the second lens group is a positive distortion lens group.

8. The fixed-focus lens as claimed in claim 1, wherein a surface of the fourth lens facing the reduced side has a curvature radius R, an effective focal length of the fixed-focus lens is f, and the fixed-focus lens satisfies $0.2 < R/f < 1$.

9. The fixed-focus lens as claimed in claim 1, wherein a surface of the third lens facing the enlarged side is defined as a fourth surface, a surface of the third lens facing the reduced side is defined as a fifth surface, a surface of the fourth lens facing the enlarged side is defined as a sixth surface, a surface of the fifth lens facing the reduced side is defined as a seventh surface, a distance between the fifth surface and the sixth surface is $L_2$, a distance between the fourth surface and the seventh surface is $L_3$, and the fixed-focus lens satisfies $0.2 < L_2/L_3 < 0.5$.

10. The fixed-focus lens as claimed in claim 1, wherein refractive powers of the first lens, the second lens, and the third lens are negative, positive, and positive in sequence.

11. The fixed-focus lens as claimed in claim 10, wherein the first lens is a biconcave lens, and each of the second lens and the third lens is a biconvex lens.

12. The fixed-focus lens as claimed in claim 1, wherein refractive powers of the fourth lens, the fifth lens, and the sixth lens are negative, positive, and positive in sequence.

13. The fixed-focus lens as claimed in claim 12, wherein the fourth lens is a biconcave lens, the fifth lens is a concave-convex lens with a convex surface facing the reduced side, and the sixth lens is a concave-convex lens with a convex surface facing the enlarged side.

14. The fixed-focus lens as claimed in claim 12, wherein the fourth lens is a biconcave lens, the fifth lens is a concave-convex lens with a convex surface facing the reduced side, and the sixth lens is a biconvex lens.

15. The fixed-focus lens as claimed in claim 1, wherein the seventh lens has a positive refractive power.

16. The fixed-focus lens as claimed in claim 15, wherein the seventh lens is a plane-convex lens with a convex surface facing the reduced side.

17. The fixed-focus lens as claimed in claim 1, further comprising a total internal reflection prism, wherein the total internal reflection prism leans against the seventh lens and is disposed between the second lens group and the third lens group.

18. The fixed-focus lens as claimed in claim 1, further comprising an aperture stop disposed between the first lens group and the second lens group.

* * * * *